US010895919B2

(12) United States Patent
Yan et al.

(10) Patent No.: US 10,895,919 B2
(45) Date of Patent: Jan. 19, 2021

(54) GESTURE CONTROL METHOD AND APPARATUS FOR DISPLAY SCREEN

(71) Applicants: Beijing BOE Optoelectronics Technology Co., Ltd., Beijing (CN); BOE TECHNOLOGY GROUP CO., LTD., Beijing (CN)

(72) Inventors: Guixin Yan, Beijing (CN); Shuo Zhang, Beijing (CN); Hao Zhang, Beijing (CN); Lili Chen, Beijing (CN); Minglei Chu, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/548,011

(22) Filed: Aug. 22, 2019

(65) Prior Publication Data

US 2020/0225759 A1 Jul. 16, 2020

(30) Foreign Application Priority Data

Jan. 11, 2019 (CN) .......................... 2019 1 0027131

(51) Int. Cl.
G06F 3/01 (2006.01)

(52) U.S. Cl.
CPC .................................... G06F 3/017 (2013.01)

(58) Field of Classification Search
CPC .......... G06F 3/017; G06F 3/0304; G06F 3/01; G06K 9/00201; G06K 9/00335; G06K 9/00355; G06K 9/00389; G06K 9/52; G06K 9/78
See application file for complete search history.

(56) References Cited

U.S. PATENT DOCUMENTS

| 2012/0038588 | A1* | 2/2012 | Li ........................ G06F 3/0428 345/175 |
| 2013/0127785 | A1* | 5/2013 | Wang ..................... G06F 3/039 345/175 |
| 2016/0179205 | A1* | 6/2016 | Katz ..................... G06F 3/013 345/156 |

* cited by examiner

Primary Examiner — Nelson M Rosario
(74) Attorney, Agent, or Firm — Thomas | Horstemeyer LLP

(57) ABSTRACT

A gesture control method includes receiving first gesture control data. The gesture control method includes converting the first gesture control data into second gesture control data of a standard coordinate system. The gesture control method includes controlling the display screen according to the second gesture control data.

12 Claims, 3 Drawing Sheets

GESTURE CONTROL METHOD AND APPARATUS FOR DISPLAY SCREEN

CROSS REFERENCE

The present application claims priority to Chinese Patent Application No. 201910027131.1 and filed Jan. 11, 2019, the entire contents of which are incorporated herein by reference.

TECHNICAL FIELD

The present disclosure relates to the field of control technologies, and more particularly, to a gesture control method and apparatus for a display screen.

BACKGROUND

With the continuous development of electronic technologies, more and more electronic media appear in different application scenarios in life. In order to improve the user experience, human-computer interactions have received extensive attention. Among them, according to the human-computer interaction of display screens, users may adjust or control contents displayed in the display screens by gesture actions.

At present, in the human-computer interaction implementation of a display screen, a gesture detection module is merely installed at a certain location of the display screen, so the users can only perform gesture control within a fixed area detectable for the gesture detection module. However, it is unable to perform gesture control of the display screen when the users perform control operations within an area beyond this fixed area, which may cause poorer gesture control performance of the display screen.

SUMMARY

In a first aspect of the present disclosure, a gesture control method for a display screen is provided. The method includes receiving first gesture control data. The first gesture control data is collected and uploaded by any one of a plurality of gesture detection modules disposed on the display screen, and detection ranges of the plurality of gesture detection modules covering various directions of the display screen. The method includes converting the first gesture control data into second gesture control data of a standard coordinate system. The standard coordinate system is a coordinate system taking a center of a preset standard gesture detection module as an origin. The method includes controlling the display screen according to the second gesture control data.

In an exemplary arrangement, before receiving first gesture control data, the method further includes obtaining gesture control data respectively corresponding to an $(N-1)^{th}$ gesture detection module and an $N^{th}$ gesture detection module in the same group of control actions. The method further includes calculating a transformation matrix and a translation matrix between the $(N-1)^{t}$ gesture detection module and the $N^{th}$ gesture detection module according to the two groups of the gesture control data. The transformation matrix and the translation matrix are configured to transform the gesture control data collected by two adjacent gesture detection modules.

In an exemplary arrangement, the first gesture control data further carry identification information of the gesture detection module. As such, converting the first gesture control data into second gesture control data of a standard coordinate system includes sequentially extracting one or more said gesture transformation matrices and said translation matrices corresponding to the first gesture control data; and recursively transforming the first gesture control data according to each of the transformation matrices and the translation matrices until the second gesture control data is obtained.

In an exemplary arrangement, before receiving first gesture control data, the method further includes responsive to a plurality of groups of gesture control data being received, determining a distance between a user and each of the plurality of gesture detection modules according to each group of the gesture control data. The plurality of groups of gesture control data are simultaneously collected and uploaded by the plurality of gesture detection modules. The method further includes determining the gesture control data corresponding to the gesture detection module nearest to the user as the first gesture control data.

In an exemplary arrangement, the method further includes respectively calculating a transformation matrix and a translation matrix corresponding to the plurality of groups of gesture control data according to the plurality of groups of gesture control data, and updating the transformation matrix and the translation matrix.

In a second aspect, the present disclosure provides a gesture control apparatus for a display screen. The apparatus includes a receiving unit, configured to receive first gesture control data. The first gesture control data is collected and uploaded by any one of a plurality of gesture detection modules disposed on the display screen. Detection ranges of the plurality of gesture detection modules cover various directions of the display screen. The apparatus includes a converting unit configured to convert the first gesture control data into second gesture control data of a standard coordinate system. The standard coordinate system is a coordinate system taking a center of a preset standard gesture detection module as an origin. The apparatus includes a control unit configured to control the display screen according to the second gesture control data.

In an exemplary arrangement, the apparatus further includes an obtaining unit configured to obtain gesture control data respectively corresponding to an $(N-1)^{th}$ gesture detection module and an $N^{th}$ gesture detection module in the same group of control actions. The apparatus includes a calculation unit configured to calculate a transformation matrix and a translation matrix between the $(N-1)^{th}$ gesture detection module and the $N^{th}$ gesture detection module according to the two groups of the gesture control data. The transformation matrix and the translation matrix are configured to transform the gesture control data collected by two adjacent gesture detection modules.

In an exemplary arrangement, the first gesture control data further carry identification information of the gesture detection module. The converting unit includes an extracting module configured to sequentially extract one or more said gesture transformation matrices and said translation matrices corresponding to the first gesture control data. The converting unit includes a transforming module configured to recursively transform the first gesture control data according to each of the transformation matrices and the translation matrices until the second gesture control data is obtained.

In an exemplary arrangement, the apparatus further includes a determining unit, configured to determine, responsive to a plurality of groups of gesture control data being received, a distance between a user and each of the plurality of gesture detection modules according to each group of the gesture control data. The plurality of groups of gesture control data are simultaneously collected and uploaded by the plurality of gesture detection modules.

The determining unit is further configured to determine the gesture control data corresponding to the gesture detection module nearest to the user as the first gesture control data.

In an exemplary arrangement, the apparatus further includes an updating unit configured to respectively calculate a transformation matrix and a translation matrix corresponding to the plurality of groups of gesture control data according to the plurality of groups of gesture control data, and update the transformation matrix and the translation matrix.

In a third aspect, the present disclosure provides a storage medium storing a plurality of instructions. The instructions are adapted to be loaded by a processor and to perform the gesture control method for the display screen as described in the first aspect.

In a fourth aspect, the present disclosure provides an electronic device, which includes a storage medium and a processor. The processor is configured to execute various instructions. The storage medium is configured to store a plurality of instructions.

The instructions are adapted to be loaded by the processor and to perform the gesture control method for the display screen as described in the first aspect.

DETAILED DESCRIPTION

The following will describe in more detail the exemplary arrangements of the present disclosure with reference to the accompanying drawings. Although the accompanying drawings display the exemplary arrangements of the present disclosure, it should be understood that the present disclosure may be implemented in various forms but not limited by the arrangements set forth herein. Instead, these arrangements are provided to more thoroughly understand the present disclosure, and completely convey the scope of the present disclosure to those skilled in the art.

Figure 1:
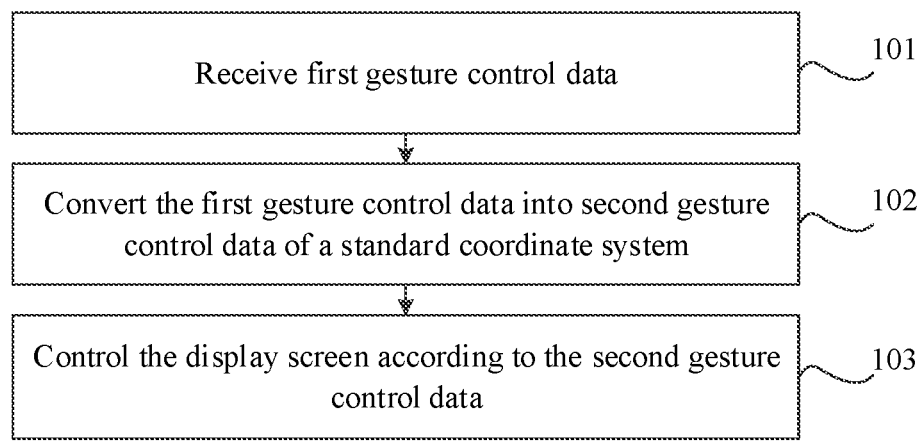
FIG. 1 illustrates a flowchart of a gesture control method for a display screen according to an arrangement of the present disclosure.

An arrangement of the present disclosure provides a gesture control method for a display screen, as shown in FIG. 1, the method includes following blocks.

In Block 101, first gesture control data are received.

Figure 2:
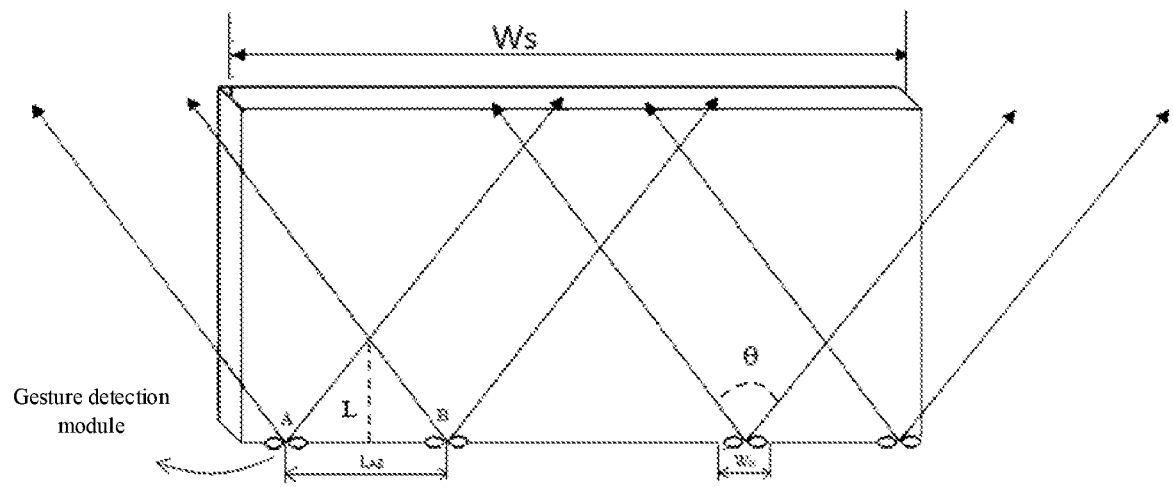
FIG. 2 illustrates a schematic structural diagram of a gesture control system for a display screen according to an arrangement of the present disclosure.

The first gesture control data are collected and uploaded by any one of a plurality of gesture detection modules disposed on the display screen, and detection ranges of the plurality of gesture detection modules cover various directions of the display screen. The number of gesture detection modules disposed in each display screen and the distance between the gesture detection modules may be set according to the actual application scenarios. For example, as shown in FIG. 2, the specific implementation manner may be divided into two blocks as below.

In the first block, according to a detection angle θ that can be covered by each gesture detection module and a maximum height value L of a detection blind area set by a user, a preset distance $L_{AB}$ between two adjacent gesture detection modules is calculated as below:

$$L_{AB} = 2L \cdot \tan\left(\frac{\theta}{2}\right)$$

In the second block, according to a width $W_s$ of the display screen, a width $W_H$ of each gesture detection module, and the preset distance $L_{AB}$ between the two adjacent gesture detection modules calculated in the above block, the number N of the gesture detection modules required is determined as below:

$$N=[(W_S-W_H)/L_{AB}]=[(W_S-W_H)/2L \tan(\theta/2)]$$

wherein N is rounded up. That is, when the calculated N is 4.6, the number of the gesture detection modules is 5. In the specific implementation process, a gesture detection module may be separately fixed at two ends of the display screen, and then the remaining gesture detection modules are evenly arranged along the display screen. In this way, an actual distance $L_{actual}$ between each two gesture detection modules may be obtained, and the $L_{actual} \leq L$.

It is to be noted that when the calculated N is a non-integer, the N is rounded up as the number of the gesture detection modules, and the actual distance between the gesture detection modules is less than the preset distance, such that the height value of the detection blind area is smaller than the maximum height value set by the user. In this way, it is ensured to meet user needs while expanding the detection range.

For the arrangements of the present disclosure, in order to improve the data processing efficiency in the control process, each two gesture detection modules are connected to the same host computer, and the server receives the gesture control data collected and uploaded by the gesture detection modules through each host computer. Next, after the server processes the gesture control data, the processed gesture control data are sent to the user and the host computer connected to the display screen. In this way, gesture control of the display screen is implemented.

In Block 102, the first gesture control data are converted into second gesture control data of a standard coordinate system.

The standard coordinate system is a coordinate system taking a center of a preset standard gesture detection module as an origin. It is to be noted that each gesture detection module has its own coordinate system, such as a plurality of coordinate systems taking a central location of each gesture detection module as a coordinate origin. When a plurality of gesture detection modules are arranged in the display screen, data collected and uploaded by each gesture detection module are data in its own coordinate system, and finally data controlled by the display screen can only be data in the same coordinate system. Therefore, in this block, it is required to convert the data collected and uploaded by each gesture detection module, such that all the gesture control data are converted into the data in the same coordinate to control the display screen.

Further, the standard coordinate system may be set according to different application scenarios. For example, when five gesture detection modules are arranged in the display screen, the coordinate system of the middle gesture detection module may be determined as the standard coordinate system. Of course, the coordinate system of either of the gesture detection modules at two ends of the display screen may be determined as the standard coordinate system, which is not specifically limited in the arrangements of the present disclosure.

For the arrangements of the present disclosure, according to specific implementation manners of this block, coordinate system fusion rules may be generated, in advance, for a plurality of coordinate systems corresponding to the plurality of gesture detection modules, and then the first gesture control data are converted into the second gesture control data according to the received first gesture control data and the coordinate system fusion rules. However, the arrangements of the present disclosure are not limited thereto.

In Block 103, the display screen is controlled according to the second gesture control data.

The control of the display screen may be operations of switching pictures, playing audio and video files, turning on and off a device and so on, which is not specifically limited in the arrangements of the present disclosure. After the gesture control data are converted in Block 102, the server controls the display screen through a host computer coupled to the display screen based on the second gesture control data. The specific implementation manner for control of the display screen may be a manner of control of the display screen based on gesture data in the related art, which is not described in detail in the arrangements of the present disclosure.

According to the gesture control method for a display screen provided by the arrangements of the present disclosure, a plurality of gesture detection modules are disposed on the display screen, first gesture control data collected and uploaded by any one of the gesture detection modules are received, then the first gesture control data are converted into second gesture control data in a standard coordinate system, and the display screen is controlled using the second gesture control data. In the related art, when a user performs gesture control on a display screen, it is required to perform gesture control within a designated area, but it is unable to effectively control the display screen when performing operations beyond this area. In contrast, according to the technical solutions provided by some arrangements of the present disclosure, the display screen can be effectively controlled no matter in which direction the control operations are performed on the display screen, so it is unnecessary to perform control within a designated area, and thus the gesture control performance of the display screen is improved.

Figure 3:
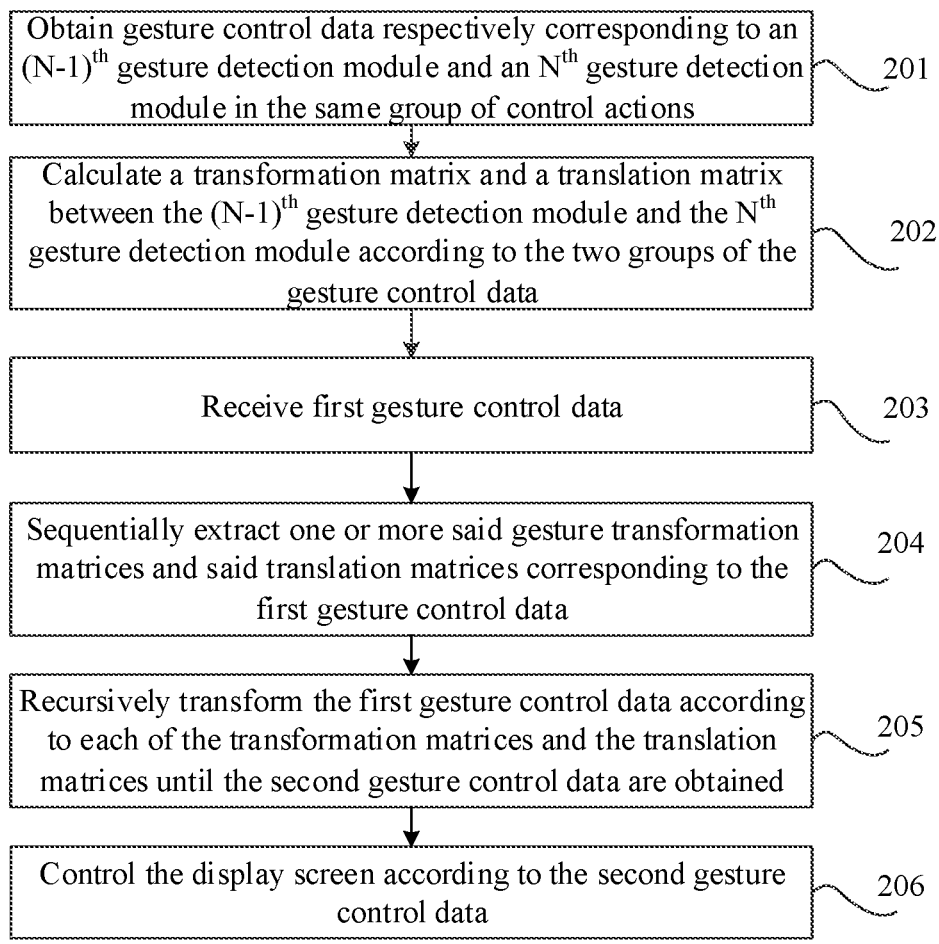
FIG. 3 illustrates a flowchart of another gesture control method for a display screen according to an arrangement of the present disclosure.

To provide a more detailed description below, an arrangement of the present disclosure provides another gesture control method for a display screen. Specifically, as shown in FIG. 3, the method includes following blocks.

In Block 201, gesture control data respectively corresponding to an $(N-1)^{th}$ gesture detection module and an $N^{th}$ gesture detection module in the same group of control actions can be obtained.

The gesture control data may be coordinate values of locations of hands of the user at a plurality of moments within a time period when the user performs a control operation. For example, when the user controls the display screen based on a gesture, the gesture control data respectively obtained by two gesture detection modules at 12 moments are as below:

$$C1 = \begin{bmatrix} x_{11} & x_{12} & \cdots & x_{1k} \\ y_{11} & y_{12} & \cdots & y_{1k} \\ z_{11} & z_{12} & \cdots & z_{1k} \\ 1 & 1 & \cdots & 1 \end{bmatrix} C2 = \begin{bmatrix} x_{21} & x_{22} & \cdots & x_{2k} \\ y_{21} & y_{22} & \cdots & y_{2k} \\ z_{21} & z_{22} & \cdots & z_{2k} \\ 1 & 1 & \cdots & 1 \end{bmatrix}$$

It is to be noted that, to fuse the coordinate systems respectively corresponding to the gesture detection modules in the specific implementation process, such that no matter in which direction of the display screen the user performs a gesture control, there exists a corresponding gesture detection module which collects and uploads control data to the server, then the server converts the gesture control data according to the fused coordinate systems, and finally the gesture control data in the same coordinate system is obtained to control the display screen. Therefore, it is necessary to sequentially collect, in advance, the gesture control data respectively collected by each two adjacent gesture detection modules when the user performs the same group of control actions, and a conversion relationship between the two gesture detection modules is determined according to the two groups of data.

In Block 202, a transformation matrix and a translation matrix between the $(N-1)^{th}$ gesture detection module and the $N^{th}$ gesture detection module are calculated according to the two groups of the gesture control data.

The transformation matrix and the translation matrix are configured to transform the gesture control data collected by two adjacent gesture detection modules. For example, the gesture coordinate data uploaded by the two adjacent gesture detection modules is obtained in the above blocks. If the transformation matrix and the translation matrix between the two gesture detection modules are $$R = \begin{bmatrix} R_{11} & R_{12} & R_{13} \\ R_{21} & R_{22} & R_{23} \\ R_{31} & R_{32} & R_{33} \end{bmatrix} \text{ and } T = \begin{bmatrix} T_x \\ T_y \\ T_z \end{bmatrix},$$

respectively, the transformation matrix and the translation matrix corresponding to the two gesture detection modules may be calculated according to the above collected data and [R T]*C2=C1.

For the arrangements of the present disclosure, the gesture coordinate data uploaded by each two adjacent gesture detection modules are collected in advance, then the transformation matrix and the translation matrix between the two gesture detection modules are calculated, and finally (N−1) matrix groups are obtained and saved according to identification information, so as to transform the gesture control data through the transformation matrix and the translation matrix in a specific application process.

In Block 203, first gesture control data are received.

The first gesture control data are collected and uploaded by any one of a plurality of gesture detection modules disposed on the display screen, and detection ranges of the plurality of gesture detection modules cover various directions of the display screen.

For the arrangements of the present disclosure, before the Block 203, the method may further include: when a plurality of groups of gesture control data are received, determining a distance between a user and each of the plurality of gesture detection modules according to each group of the gesture control data, the plurality of groups of gesture control data being simultaneously collected and uploaded by the plurality of gesture detection modules; and determining the gesture control data corresponding to the gesture detection module nearest to the user as the first gesture control data. Specifically, based on the collected data, the gesture detection module having the smallest coordinate value may be determined as the gesture detection module nearest to the user. It is to be noted that in a specific implementation process, there exists a case where the user performs a control operation within one area but it is simultaneously detected by two or more gesture detection modules. In this case, each gesture detection module may collect the gesture control data in its own coordinate system, and may upload the gesture control data to the server. Therefore, a plurality of groups of data received may be filtered before this block. However, since the data detected by the gesture detection module nearest to the user are more accurate, the data uploaded by the gesture detection module the nearest to the user is determined as the first gesture control data when there are a plurality of groups of gesture control data. In this way, the accuracy of the data is ensured, and the gesture control performance of the display screen is further improved.

In Block 204, one or more said gesture transformation matrices and said translation matrices corresponding to the first gesture control data are sequentially extracted.

For example, the received first gesture data are uploaded by the gesture detection module having identification information NO. 5 arranged in the display screen, and the standard coordinate system of the gesture control system in the display screen is the coordinate system corresponding to the gesture detection module whose identification information is NO. 2. This indicates that if the first gesture control data are converted into the gesture control data in the standard coordinate system, it is required to convert the first gesture control data into control data in the coordinate systems N0.4-NO.3-NO.2 in sequence. Therefore, it is required to extract the transformation matrix 45 and the translation matrix 45 between the fifth gesture detection module and the fourth gesture detection module, the transformation matrix 34 and the translation matrix 34 between the fourth gesture detection module and the third gesture detection module, and the transformation matrix 23 and the translation matrix 23 between the third gesture detection module and the second gesture detection module, so as to convert the received first gesture control data using the three groups of matrices.

In Block 205, the first gesture control data are recursively transformed according to each of the transformation matrices and the translation matrices until the second gesture control data is obtained.

According to the above example, in the conversion process, the first gesture control data are first converted into data in the coordinate system corresponding to the NO. 4 gesture detection module, then the data are converted into data in the coordinate system corresponding to the NO. 3 gesture detection module according to the transformation matrix 34 and the translation matrix 34, and finally the data are converted into data in the coordinate system corresponding to the NO. 2 gesture detection module by using the transformation matrix 23 and the translation matrix 23. In this way, the second gesture control data is obtained.

According to the arrangements of the present disclosure, for any group of the first gesture control data received, the data can be converted according to the transformation matrix and the translation matrix obtained through precalculation, and finally the control data in the same coordinate system is obtained to control the display screen based on the data.

Further, to optimize the gesture control performance of the display screen, the arrangements of the present disclosure may further include: respectively calculating a transformation matrix and a translation matrix corresponding to the plurality of groups of gesture control data according to the plurality of groups of gesture control data, and updating the transformation matrix and the translation matrix. Specifically, the transformation matrix and the translation matrix may be either updated at certain time intervals, or updated within a preset time period, which is not specifically limited in this arrangement of the present disclosure. It is to be noted that responsive to the server simultaneously receiving the data collected and uploaded by two adjacent gesture detection modules, the transformation matrix and the translation matrix corresponding to the two gesture detection modules may be calculated again according to the two groups of data to update the preset matrices in real time.

In Block 206, the display screen is controlled according to the second gesture control data.

Reference may be made to corresponding description of the Block 103 for corresponding concept explanation in this block and specific implementation manner of this block, which are not described in detail herein.

Figure 4:
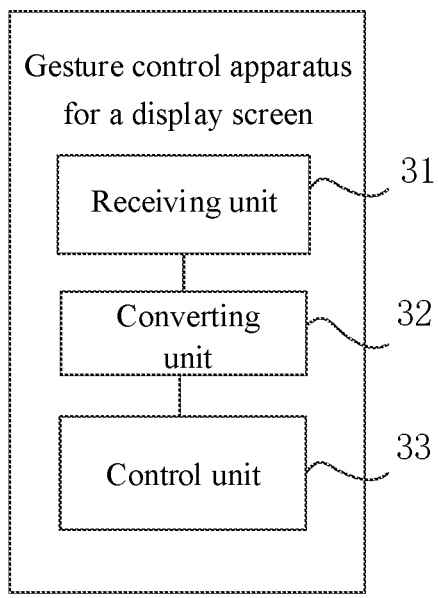
FIG. 4 illustrates a composition block diagram of a gesture control apparatus for a display screen according to an arrangement of the present disclosure.

Further, according to the above method arrangement, another arrangement of the present disclosure also provides a gesture control apparatus for a display screen. As shown in FIG. 4, the apparatus mainly includes: a receiving unit 31, a converting unit 32, and a control unit 33.

The receiving unit 31 is configured to receive first gesture control data, the first gesture control data are collected and uploaded by any one of a plurality of gesture detection modules disposed on the display screen, and detection ranges of the plurality of gesture detection modules cover various directions of the display screen.

The converting unit 32 can be a chip integrated with host computer of a server. The gesture control apparatus includes a host computer connected with the gesture detection modules. The gesture detection module can be a sensor or camera. Two gesture detection modules are connected to the same host computer, and the server receives the gesture control data collected and uploaded by the gesture detection modules through each host computer.

The converting unit 32 is configured to convert the first gesture control data received by the receiving unit 31 into second gesture control data of a standard coordinate system, wherein the standard coordinate system is a coordinate system taking a center of a preset standard gesture detection module as an origin.

The converting unit 32 can be a chip capable of calculating and converting data. The chip can be integrated with host computer of the server and convert the date received by the server.

The control unit 33 is configured to control the display screen according to the second gesture control data obtained by converting by the converting unit 32.

The control unit 33 can be a controller integrated with the host computer of the server and control the display screen through the host computer connected with the display screen.

Figure 5:
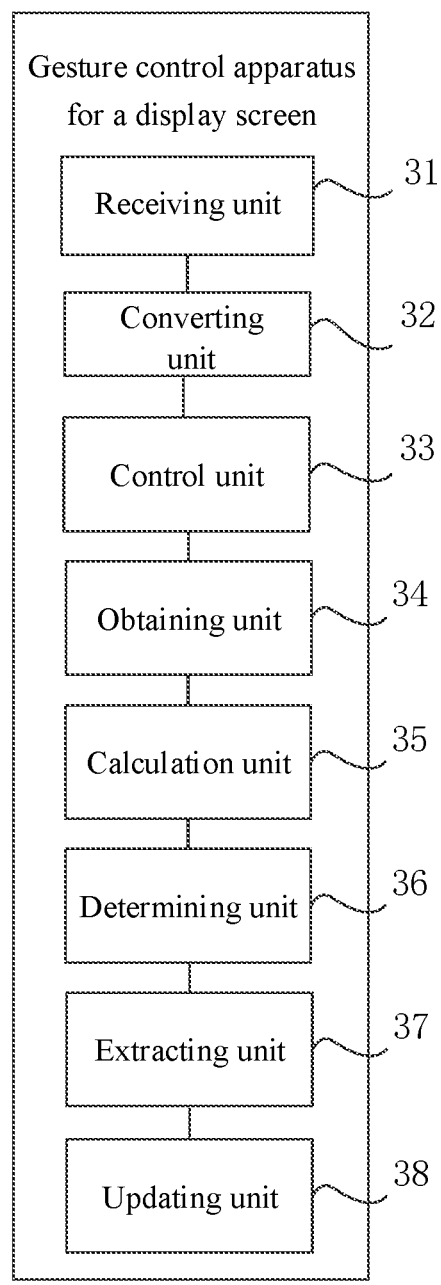
FIG. 5 illustrates a composition block diagram of another gesture control apparatus for a display screen according to an arrangement of the present disclosure.

Further, as shown in FIG. 5, the apparatus further includes:

an obtaining unit 34, configured to obtain gesture control data respectively corresponding to an $(N-1)^{th}$ gesture detection module and an $N^{th}$ gesture detection module in the same group of control actions; and a calculation unit 35, configured to calculate a transformation matrix and a translation matrix between the $(N-1)^{t}$ gesture detection module and the $N^{th}$ gesture detection module according to the two groups of the gesture control data.

Further, as shown in FIG. 5, the apparatus further includes:

a determining unit 36, configured to determine, responsive to a plurality of groups of gesture control data being received, a distance between a user and each of the plurality of gesture detection modules according to each group of the gesture control data, wherein the plurality of groups of gesture control data are simultaneously collected and uploaded by the plurality of gesture detection modules.

The determining unit 36 is further configured to determine the gesture control data corresponding to the gesture detection module nearest to the user as the first gesture control data.

Further, as shown in FIG. 5, the apparatus further includes an extracting unit 37.

The extracting unit 37 is configured to sequentially extract one or more said gesture transformation matrices and said translation matrices corresponding to the first gesture control data.

The converting unit 32 is further configured to recursively convert the first gesture control data according to each of the transformation matrices and the translation matrices until the second gesture control data is obtained.

Further, as shown in FIG. 5, the apparatus further includes:

an updating unit 38, configured to respectively calculate a transformation matrix and a translation matrix corresponding to the plurality of groups of gesture control data according to the plurality of groups of gesture control data, and update the transformation matrix and the translation matrix.

The obtaining unit 34, the calculation unit 35, the determining unit 36, the extracting unit 37, the converting unit 32 and the updating unit 38 can be a chip integrated with the host computer of the sever.

According to the solutions provided by the above arrangements, the arrangements of the present disclosure provide a gesture control method and apparatus for a display screen. A plurality of gesture detection modules are disposed on the display screen, first gesture control data collected and uploaded by any one of the gesture detection modules are received, then the first gesture control data are converted into second gesture control data in a standard coordinate system, and the display screen is controlled using the second gesture control data. In the related art, when a user performs gesture control on a display screen, it is required to perform gesture control within a designated area, but it is unable to effectively control the display screen when performing operations beyond this area. In contrast, according to the technical solutions provided by some arrangements of the present disclosure, the display screen can be effectively controlled no matter in which direction the control operations are performed on the display screen, so it is unnecessary to perform control within a designated area, and thus the gesture control performance of the display screen is improved.

Further, according to the above method arrangement, another arrangement of the present disclosure also provides a storage medium storing a plurality of instructions, wherein the instructions are adapted to be loaded by a processor and to perform the gesture control method for the display screen as described above.

The storage medium for gesture control of the display screen provided by the above arrangement of the present disclosure stores instructions. According to the instructions, a plurality of gesture detection modules are disposed on the display screen, first gesture control data collected and uploaded by any one of the gesture detection modules are received, then the first gesture control data are converted into second gesture control data in a standard coordinate system, and the display screen is controlled using the second gesture control data. In this way, the display screen may be controlled no matter in which direction the control operations are performed on the display screen, so it is unnecessary to perform control within a designated area, and thus the gesture control performance of the display screen is improved.

Further, according to the above method arrangement, another arrangement of the present disclosure also provides an electronic device, which includes a storage medium and a processor.

The processor is configured to execute various instructions.

The storage medium is configured to store a plurality of instructions.

The instructions are adapted to be loaded by the processor and to perform the gesture control method for the display screen as described above.

According to the electronic device for gesture control of the display screen provided by the above arrangement of the present disclosure, a plurality of gesture detection modules are disposed on the display screen, first gesture control data collected and uploaded by any one of the gesture detection modules are received, then the first gesture control data are converted into second gesture control data in a standard coordinate system, and the display screen is controlled using the second gesture control data. In this way, the display screen may be controlled no matter in which direction the control operations are performed on the display screen, so it is unnecessary to perform control within a designated area, and thus the gesture control performance of the display screen is improved.

Among the foregoing arrangements, description of various arrangements may be focused on differentially, and a part not expatiated in a certain arrangement may refer to related description of other arrangements.

It is to be understood that cross reference may be made to the relevant features of the above method and apparatus. Furthermore, the "first", "second" and so on in the above arrangements are used to differentiate the arrangements but do not represent superiorities and inferiorities of the arrangements.

Those skilled in the art should realize that the arrangements of the present disclosure may be provided as a method, a system or a computer program product. Therefore, the present disclosure may adopt the form of full hardware arrangements, full software arrangements or arrangements in combination of software and hardware. Furthermore, the present disclosure may use forms of computer program products implemented on one or more computer storage media (including but not limited to a magnetic disk memory, a CD-ROM, an optical memory or the like) which includes a computer program code.

The present disclosure is described in reference to the flowchart and/or block diagram of a method, a device (system) or a computer program product according to the arrangements of the present disclosure. It is to be understood that each flow and/or block in the flowchart and/or block diagram as well as combination of flow and/or block in the flowchart and/or block diagram may be realized by computer program instructions. These computer program instructions may be provided for a general-purpose computer, a special-purpose computer, an embedded processor or processors of other programmable data processing terminal equipment to generate a machine, so as to generate an apparatus configured to implement designated functions in one or more flows of a flowchart and/or one or more blocks of a block diagram by means of instructions executed by a computer or a processor of other programmable data processing equipment.

These computer program instructions may also be stored in a computer-readable memory that can guide a computer or other programmable data processing equipment to work in a particular way, so that the instructions stored in the computer-readable memory generate a manufactured product including a command device that implements the designated functions in one or more flows of a flowchart and/or one or more blocks of a block diagram.

These computer program instructions may also be loaded on a computer or other programmable data processing equipment, to execute a series of operating blocks on the computer or other programmable equipment to generate treatments implemented by the computer, so that instructions executed on the computer or other programmable equipment provide blocks configured to implement designated functions in one or more flows of a flowchart and/or one or more blocks of a block diagram.

In a typical configuration, the computer equipment includes one or more CPUs, input-output interfaces, network interfaces and memories.

A memory may comprise a volatile memory in a computer-readable medium, a random access memory (RAM) and/or a non-volatile memory, such as a read-only memory (ROM) or a flash RAM. A memory is an example of a computer-readable medium.

A computer-readable medium comprises a non-volatile medium, a volatile medium, a mobile medium or an immobile medium, which may implement information storage by means of any method or technology. Information may be a computer-readable instruction, a data structure, a module of a program, or other data. Examples of computer storage media comprise but are not limited to a phase change random access memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical memories, a cartridge magnetic tape, a magnetic tape or magnetic disk memory or other magnetic storage devices or any other non-transmission media, which may be configured to store information that can be accessed by a computing device. As defined herein, computer-readable media do not include transitory media, for example, modulated data signals and carriers.

Furthermore, terms such as "comprise", "include" or other variants thereof are intended to cover a non-exclusive "comprise" so that a process, a method, a merchandise or a device comprising a series of elements not only includes these elements, but also includes other elements not listed explicitly, or also includes inherent elements of the process, the method, the merchandise or the device. In the case of no more restrictions, elements restricted by a sentence "include a" do not exclude the fact that additional identical elements may exist in a process, a method, a merchandise or a device of these elements.

Those skilled in the art should realize that the arrangements of the present disclosure may be provided as a method, a system or a computer program product. Therefore, the present disclosure may adopt the form of full hardware arrangements, full software arrangements or arrangements in combination of software and hardware. Furthermore, the present disclosure may use forms of computer program products implemented on one or more computer storage media (including but not limited to a magnetic disk memory, a CD-ROM, an optical memory or the like) which includes a computer program code.

The arrangements described above are only illustrated as arrangements of the present disclosure, and are not intended to limit the present disclosure. To those skilled in the art, various modifications and variations may be available for the present application. All modifications, equivalent substitutions and improvements made within the spirit and principle of the present application shall fall within the protection scope of the claims of the present application.

What is claimed is:

1. A gesture control method for a display screen, comprising:
   receiving first gesture control data, the first gesture control data being collected and uploaded by one of a plurality of gesture detection modules disposed on a display screen, and detection ranges of the plurality of gesture detection modules covering various directions of the display screen;
   converting the first gesture control data into second gesture control data of a standard coordinate system, the standard coordinate system being a coordinate system taking a center of a preset standard gesture detection module as an origin;
   controlling the display screen according to the second gesture control data; and
   before receiving first gesture control data:
      obtaining gesture control data respectively corresponding to an (N−1)th gesture detection module and an Nth gesture detection module in a same group of control actions, which are the first gesture control data and the second gesture control data, respectively; and
      calculating a transformation matrix and a translation matrix between the (N−1)th gesture detection module and the Nth gesture detection module according to the first gesture control data and the second gesture control data, the transformation matrix and the translation matrix being configured to transform the first gesture control data and the second gesture control data.

2. The gesture control method for the display screen according to claim 1, wherein:
   the first gesture control data further comprises identification information of the gesture detection module, and
   converting the first gesture control data into second gesture control data of the standard coordinate system further comprises:
   sequentially extracting one or more gesture transformation matrices and translation matrices corresponding to the first gesture control data; and recursively transforming the first gesture control data according to each of the gesture transformation matrices and the translation matrices until the second gesture control data is obtained.

3. The gesture control method for the display screen according to claim 2, wherein before receiving first gesture control data, the method further comprises:
responsive to a plurality of groups of gesture control data being received, determining a distance between a user and each of the plurality of gesture detection modules according to each of the plurality of groups of the gesture control data, the plurality of groups of gesture control data being simultaneously collected and uploaded by the plurality of gesture detection modules; and
determining one of the groups of gesture control data corresponding to the gesture detection module nearest to the user as the first gesture control data.

4. The gesture control method for the display screen according to claim 3, further comprising:
respectively calculating a transformation matrix and a translation matrix corresponding to each of the plurality of groups of gesture control data according to the plurality of groups of gesture control data; and
updating the transformation matrix and the translation matrix.

5. The gesture control method for the display screen according to claim 1, wherein before receiving first gesture control data, the method further comprises:
responsive to a plurality of groups of gesture control data being received, determining a distance between a user and each of the plurality of gesture detection modules according to each of the plurality of groups of the gesture control data, the plurality of groups of gesture control data being simultaneously collected and uploaded by the plurality of gesture detection modules; and
determining one of the groups of gesture control data corresponding to the gesture detection module nearest to the user as the first gesture control data.

6. The gesture control method for the display screen according to claim 5, further comprising:
respectively calculating a transformation matrix and a translation matrix corresponding to each of the plurality of groups of gesture control data according to the plurality of groups of gesture control data; and
updating the transformation matrix and the translation matrix.

7. A gesture control apparatus for a display screen, comprising:
a receiving unit configured to receive first gesture control data, the first gesture control data being collected and uploaded by one of a plurality of gesture detection modules disposed on a display screen, and detection ranges of the plurality of gesture detection modules covering various directions of the display screen;
a converting unit configured to convert the first gesture control data into second gesture control data of a standard coordinate system, the standard coordinate system being a coordinate system taking a center of a preset standard gesture detection module as an origin; and
a control unit configured to control the display screen according to the second gesture control data;
an obtaining unit configured to obtain gesture control data respectively corresponding to an $(N-1)^{th}$ gesture detection module and an $N^{th}$ gesture detection module in a same group of control actions; and
a calculation unit configured to calculate a transformation matrix and a translation matrix between the $(N-1)^{th}$ gesture detection module and the $N^{th}$ gesture detection module according to the first gesture control data and the second gesture control data, the transformation matrix and the translation matrix being configured to transform the first gesture control data and the second gesture control data.

8. The gesture control apparatus for the display screen according to claim 7, wherein:
the first gesture control data further comprises identification information of the gesture detection module; and
the converting unit comprises:
an extracting module configured to sequentially extract one or more gesture transformation matrices and translation matrices corresponding to the first gesture control data; and
a transforming module configured to recursively transform the first gesture control data according to each of the transformation matrices and the translation matrices until the second gesture control data is obtained.

9. The gesture control apparatus for the display screen according to claim 8, further comprising a determining unit configured to:
determine, responsive to a plurality of groups of gesture control data being received, a distance between a user and each of the plurality of gesture detection modules according to each of the plurality of groups of the gesture control data, the plurality of groups of gesture control data being simultaneously collected and uploaded by the plurality of gesture detection modules; and
determine one of the groups of gesture control data corresponding to the gesture detection module nearest to the user as the first gesture control data.

10. The gesture control apparatus for a display screen according to claim 9 further comprising an updating unit configured to:
respectively calculate a transformation matrix and a translation matrix corresponding to each of the plurality of groups of gesture control data according to the plurality of groups of gesture control data; and
update the transformation matrix and the translation matrix.

11. The gesture control apparatus for the display screen according to claim 7, further comprising a determining unit configured to:
determine, responsive to a plurality of groups of gesture control data being received, a distance between a user and each of the plurality of gesture detection modules according to each of the plurality of groups of the gesture control data, the plurality of groups of gesture control data being simultaneously collected and uploaded by the plurality of gesture detection modules; and
determine one of the groups of gesture control data corresponding to the gesture detection module nearest to the user as the first gesture control data.

12. The gesture control apparatus for the display screen according to claim 11, further comprising an updating unit configured to:
respectively calculate a transformation matrix and a translation matrix corresponding to each of the plurality of groups of gesture control data according to the plurality of groups of gesture control data; and update the transformation matrix and the translation matrix.

\* \* \* \* \*